(12) United States Patent
Amemiya et al.

(10) Patent No.: US 10,621,659 B2
(45) Date of Patent: Apr. 14, 2020

(54) METHOD AND SYSTEM FOR FORECASTING USING AN ONLINE ANALYTICAL PROCESSING DATABASE

(71) Applicant: International Business Machines Corporation, Armonk, NY (US)

(72) Inventors: Yasuo Amemiya, Hartsdale, NY (US); Jonathan R. M. Hosking, Scarsdale, NY (US); Wanli Min, Mount Kisco, NY (US); Laura Wynter, Chappaqua, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 265 days.

(21) Appl. No.: 15/618,527

(22) Filed: Jun. 9, 2017

(65) Prior Publication Data

US 2017/0278184 A1    Sep. 28, 2017

Related U.S. Application Data

(63) Continuation of application No. 11/693,999, filed on Mar. 30, 2007, now Pat. No. 9,715,710.

(51) Int. Cl.
*G06Q 40/02* (2012.01)
*G06Q 40/00* (2012.01)

(52) U.S. Cl.
CPC ............. *G06Q 40/02* (2013.01); *G06Q 40/00* (2013.01)

(58) Field of Classification Search
CPC ................................ G06Q 40/00; G06Q 40/02
See application file for complete search history.

(56) References Cited

U.S. PATENT DOCUMENTS

| | | | | |
|---|---|---|---|---|
| 5,799,300 | A | * | 8/1998 | Agrawal ........... G06F 16/24556 |
| 6,151,582 | A | * | 11/2000 | Huang ................... G06Q 10/06 705/7.25 |
| 6,167,396 | A | * | 12/2000 | Lokken ................ G06F 16/283 707/737 |
| 6,442,560 | B1 | | 8/2002 | Berger et al. |
| 6,484,179 | B1 | | 11/2002 | Roccaforte |

(Continued)

OTHER PUBLICATIONS

SAS White Paper, "Assessing the Value of Demand Forecasting in Your Organization," 2006.*

(Continued)

*Primary Examiner* — Renae Feacher
(74) *Attorney, Agent, or Firm* — Daniel P. Morris; McGinn IP Law Group, PLLC

(57) ABSTRACT

A method for providing a forecast includes providing a multi-dimensional database storing data at a lowest level in a first dimension, calculating a first forecast at a level that is higher than the lowest level of a first dimension in the database, calculating a forecast for each category within the lowest level of the first dimension, aggregating a second forecast across a category at the lowest level of the first dimension based upon an aggregation of the calculated forecast for the category within the lowest level of the first dimension, determining a difference between the first forecast and the second forecast, creating a dummy category including a new category at the lowest level of the first dimension, and storing the difference in the dummy category at the lowest level of the first dimension.

20 Claims, 8 Drawing Sheets

(56) References Cited

U.S. PATENT DOCUMENTS

| | | | |
|---|---|---|---|
| 6,510,420 B1* | 1/2003 | Cessna | G06Q 10/06 706/45 |
| 6,542,895 B1 | 4/2003 | DeKimpe | |
| 6,766,325 B1* | 7/2004 | Pasumansky | G06F 16/248 |
| 6,804,657 B1* | 10/2004 | Sultan | G06Q 10/06 705/7.31 |
| 6,829,621 B2 | 12/2004 | Keller | |
| 6,988,104 B2 | 1/2006 | Kootale | |
| 7,133,865 B1* | 11/2006 | Pedersen | G06F 16/24539 |
| 7,593,955 B2 | 9/2009 | Legault et al. | |
| 2002/0035565 A1 | 3/2002 | Shah | |
| 2002/0059203 A1 | 5/2002 | Witkowski et al. | |
| 2003/0023608 A1 | 1/2003 | Egilsson et al. | |
| 2004/0088211 A1* | 5/2004 | Kakouros | G06Q 30/0202 705/7.31 |
| 2004/0098296 A1 | 5/2004 | Bamberg et al. | |
| 2005/0065955 A1 | 3/2005 | Babikov et al. | |
| 2005/0071262 A1 | 3/2005 | Kobeh et al. | |
| 2005/0071341 A1 | 3/2005 | Chkodrov et al. | |
| 2006/0200376 A1* | 9/2006 | Wang | G06Q 10/06 705/7.31 |
| 2006/0247859 A1 | 11/2006 | Ladde | |
| 2007/0112830 A1 | 5/2007 | Danas et al. | |

OTHER PUBLICATIONS

"Cognos Enterprise BI Series Cognos Powerplay, Powerplay Web user's guide," 2004 Cognos Incoporated.*

Kahn, Kenneth B, "Revisting top-down versus bottom-up forecasting," The Journal of Busness Forecasting, Summer 1998.*

Espil, Mauricio and Vaisman, Alejandro, "Efficient Intensional Redefinition of Aggregation Hierarchies in Multidimensional Databases," DOLAP '01, Nov. 9, 2001, Atlanta, GA.*

Office Action in U.S. Appl. No. 11/693,999 dated Nov. 22, 2010.

Cognos, Inc. Cognos(R) BI—Cognos Powerplay (R). 2004, <http://cogpubbkp.cabq.gov/cognos/help/pwr_ppweb.pdf>.

Cognos, Inc. Cognos(R) Business Intelligence Series 7—Cognos Powerplay (R) for Windows. 2006.

Pourabbas, Elaheh and Rafanelli, Maurizio. "Characterization of Hierarchies and Some Operators in OLAP Environment" DOLAP 99 Kansas City, MO, 1999.

Kahn, Kenneth B. "Revisiting Top-Down Versus Bottom-up Forecasting," The Journal of Business Forecasting, Summer 1998.

Mehta, Krishna. "Top Down or Bottom Up? Consider Hybrid," InforManagement direct, Sep. 2006.

Office Action in U.S. Appl. No. 11/693,999 dated May 10, 2011.

Tsois, Aris, Karayannidis, Nikos and Sellis, Timos. MAC: Conceptual Data Modeling for OLAP, Proceedings of the International Workshop on Design and Management of Data Warehouses, Switzerland, Jun. 2001.

Office Action in U.S. Appl. No. 11/693,999 dated Dec. 3, 2013.
Office Action in U.S. Appl. No. 11/693,999 dated Jun. 18, 2014.
Office Action in U.S. Appl. No. 11/693,999 dated Sep. 15, 2014.
Office Action in U.S. Appl. No. 11/693,999 dated Apr. 2, 2015.
Office Action in U.S. Appl. No. 11/693,999 dated Sep. 21, 2015.
Whitney, Russ, "Custom Rollups," SQL Server Pro, Dec. 19, 2000.
Office Action in U.S. Appl. No. 11/693,999 dated Mar. 25, 2016.
Office Action in U.S. Appl. No. 11/693,999 dated Sep. 7, 2016.
Notice of Allowance in U.S. Appl. No. 11/693,999 dated Mar. 17, 2017.

Espil, Maricio and Vaisman, Alejandro, "Efficient Intentional Redefinition of Aggregation Hierarchies in Multidimensional Databases," DOLAP '01, Atlanta, GA Nov. 9, 2001.

* cited by examiner

METHOD AND SYSTEM FOR FORECASTING USING AN ONLINE ANALYTICAL PROCESSING DATABASE

The present application is a Continuation Application of U.S. patent application Ser. No. 11/693,999, filed on Mar. 30, 2007, the entire content of which is incorporated herein by reference.

FIELD OF THE INVENTION

The present invention generally relates to a method and a system for forecasting. In particular, the present invention provides a method and system for forecasting using an OnLine Analytical Processing database.

DESCRIPTION OF THE RELATED ART

There is a class of conventional software products called OnLine Analytical Processing (OLAP) products. These OnLine Analytical Processing products are similar to relational databases, however, they are oftentimes customized for specific purposes and/or functions such as, for example, financial reporting.

Enterprises typically use data management and presentation software to make financial data viewable. The levels of an enterprise company may be divided geographically, with the lower levels representing regional offices, for example, and higher levels representing continental or multi-continent areas. In addition to geographic division, enterprises often present financial data, by product line or type. So, different dimensions, e.g., geographical and product line dimensions, may divide an enterprise into a cross-classified structure. Each dimension may have a hierarchical set of levels that may be represented by a tree structure. For example, a geographical dimension may be represented by a tree structure having a geographic dimension that is divided into levels. A high level may represent a continent, a next lower level may represent countries, a next lower level may represent regions within countries, and so on. A user in such an enterprise may need financial data to be presented in this dimensionally cross-classified structure with hierarchical levels in each dimension.

Further, different parts of an enterprise may also require other views of financial data, and OnLine Analytical Processing products have enabled a multi-dimensional data structure to be represented through different views. For example, the regional sales for a product type may be viewed by the regional representatives. If a country representative wishes to view all sales for that product type in the country, the software performs an "add" function (i.e., an aggregation) on the regional sales data and obtains a higher, country level view. Similarly, views from a single product type to a multi-product line can be viewed using the aggregation feature of OnLine Analytical Processing software.

An OnLine Analytical Processing product is advantageous for complex queries. These OnLine Analytical Processing products generally produce financial reports much faster than if a relational database was used.

The single most important mechanism in OnLine Analytical Processing, which allows it to achieve improved performance, is the use of an aggregation function. Aggregations are built from a fact table by changing the granularity on specific dimensions and aggregating upward along these dimensions. For example, given a sales database that records sales at the level of a particular product, the location of each sale, the location of the customer, and a customer business sector, and a request for the number of sales to all telecommunications companies, how many sales of a product in Ohio, how many sales in the United States, or the World, conventional OnLine Analytical Processing will quickly generate a report based upon an aggregation across each of these levels.

OnLine Analytical Processing is not necessarily limited to financial type data. OnLine Analytical Processing may generate different types of reports by aggregating across dimensions.

On Line Analytical Processing applications provide an approach to quickly provide the answer to analytical queries that are dimensional in nature. Typical applications of OnLine Analytical Processing are in business reporting for sales, marketing, management reporting, business process management, budgeting and forecasting, financial reporting, and similar areas.

Databases that are configured for OnLine Analytical Processing employ a multidimensional data model, allowing for complex analytical and ad-hoc queries with a rapid execution time.

At the core of any OnLine Analytical Processing system is a concept of an OnLine Analytical Processing cube (also called "multidimensional cube"). An OnLine Analytical Processing cube includes numerous facts called "measures" which are categorized by "dimensions." The cube metadata is typically created from a star schema or snowflake schema of tables in a relational database. Measures are derived from the records in the fact table and dimensions are derived from the dimension tables.

OnLine Analytical Processing data cubes only store data at the lowest level. In other words, an OnLine Analytical Processing data cube which is represented as a tree structure only includes data at the leaves of the data tree. OnLine Analytical Processing data cubes cannot store data regarding a branch level of the tree. For example, once you calculate a revenue forecast at a higher level, the OnLine Analytical Processing data structure does not permit storing that data regarding that higher level. OnLine Analytical Processing applications are only capable of aggregating across different dimensions of leaf data.

What makes OnLine Analytical Processing so useful, powerful, and fast is that the data is arranged only at the lowest level and rules are defined at this level. OnLine Analytical Processing programs provide the ability to very easily do many different kinds of aggregations across an OnLine Analytical Processing cube structure.

These types of financial data management applications are convenient for a wide variety of factual data on enterprises such as sales and resource levels. Raw financial data such as sales and resources inherently have an additive aggregation structure, and can be viewed conveniently using OnLine Analytical Processing software tools. However, some computed financial metrics, such as revenue and sales forecasts, may not have this additive structure. For example, forecasts may be computed or issued separately for a higher-level organization and a lower-level one, cross-classified by another dimension. When manipulated, modified, or computed financial data are desired, these conventional financial data management applications present serious drawbacks. In particular, so as to facilitate the multiple levels and different views in a single framework, the aggregation is performed by adding the values in the lower categories to obtain the values for the higher categories above them In the case of advanced methods in forecasting, it is no longer possible to aggregate lower-level forecasts to the higher-level forecasts through simple addition. Indeed, usually, advanced methods for forecasting make use of multiple levels of forecasts. Simple aggregation of the lower levels will not provide as accurate a forecast at a higher level as a procedure forecasting directly at the higher level.

SUMMARY OF THE INVENTION

As explained above, conventional revenue forecasting using an OnLine Analytical Processing application resulted in forecasts that were not accurate. The inventors discovered that the difficulty is that the OnLine Analytical Processing merely aggregates the data that is stored at the low level dimensions to obtain a forecast at a higher level. For example, to obtain a revenue forecast a conventional OnLine Analytical Processing system merely aggregates the forecasts that are stored at the lower level, e.g., state, by state, and presents the aggregate value as a forecast at a higher level, e.g., the region or country level.

The inventors discovered that an aggregation of values at a lower level does not provide an accurate forecast for a higher level because accurate statistical forecasting relies upon the use of a function or functions which may not merely rely upon an aggregation function. For example, typical statistical forecasting relies upon a regression analysis. A regression analysis may be conducted accurately at a low level, however, a regression analysis at a higher level is generally inaccurate when applied to aggregated data. For example, using conventional OnLine Analytical Processing, the fact that sales numbers at a high level are aggregated means that the forecast at the high level is never going to be equal to the aggregate of the revenue forecasts at the lower level. This is primarily because the aggregation of values at the lower level results in cancellations.

Additionally, higher level forecasts may rely upon a slightly different forecasting method than that which may be used at the lower levels. In other words, a prediction at a higher level is not going to be equal to the sum (the aggregate) of the predictions at a lower level is provided by conventional OnLine Analytical Processing.

Accurate forecasting methods do not rely merely upon an aggregation function. Conventional OnLine Analytical Processing applications are only capable of performing aggregations. In general, aggregation functions compute a single result from a collection of input values. For example, if a revenue forecast for a particular product for the United States is desired, a conventional OnLine Analytical Processing cube would only provide the sum of the forecasts for each state for that product. These conventional OnLine Analytical Processing applications cannot provide an accurate forecast at a level which is higher than the lowest level.

It is desirable to continue to use OnLine Analytical Processing cubes because of their speed of execution, but to allow for more accurate forecasting methods.

In a first exemplary aspect of the present invention, a method for providing a forecast includes providing a multi-dimensional database storing data at a lowest level in a first dimension, calculating a first forecast at a level that is higher than the lowest level of a first dimension in the database, calculating a forecast for each category within the lowest level of the first dimension, aggregating a second forecast across all categories at the lowest level of the first dimension based upon an aggregation of the calculated forecasts for each category within the lowest level of the first dimension, determining a difference between the first forecast and the second forecast, and storing the difference in a dummy category at the lowest level of the first dimension.

In a second exemplary aspect of the present invention, a system for providing a forecast includes a database storing multi-dimensional data at a lowest level, an accurate forecaster that calculates a first forecast at a level in a first dimension that is higher than the lowest level in the database and that calculates a forecast for each category within the lowest level in the first dimension, another forecaster that calculates a second forecast based upon an aggregation of the calculated forecasts for each category within the lowest level in the first dimension, and a difference determiner that determines a difference between the first forecast and the second forecast and that stores the difference in a dummy category at the lowest level in the first dimension of the multi-dimensional database.

In a third exemplary aspect of the present invention, a system for forecasting includes means for calculating a first forecast at a level that is higher than the lowest level of a first dimension in the database, means for calculating a forecast for each category within the lowest level of the first dimension, means for aggregating a second forecast across all categories at the lowest level of the first dimension based upon an aggregation of the calculated forecasts for each category within the lowest level of the first dimension, means for determining a difference between the first forecast and the second forecast, and means for storing the difference in a dummy category at the lowest level of the first dimension.

An exemplary embodiment of the present invention provides an OnLine Analytical Processing cube with a "dummy" category to represent information that is not associated with any existing category at that level. For example, at a state category level, there may be fifty categories of states at that level (one for each state in the United States), the "dummy" category would include information that is not associated with any state. For example, a customer may not have a headquarters in any state, therefore, a sales representative may place information regarding a sale to that customer into a dummy category. The OnLine Analytical Processing application will always sum up all of the sales across all categories at that level including all states and the dummy category.

An exemplary embodiment of the present invention determines forecasts for each category at a low level, then determines a first forecast at a higher level by aggregating all of the forecasts for each category at the low level, determines a second forecast at the higher level without merely performing an aggregation, determines the difference between the first forecast and the second forecast, and stores the difference in a dummy category at the low level.

Once this value is stored in the dummy category at the low level, OnLine Analytical Processing may then be used to aggregate across all categories at the low level, including the dummy category, and a more accurate forecast is obtained. For example, for sales forecasts that are organized in an OnLine Analytical Processing cube having a lowest level of a state level, for each state, the invention determines forecasts for each state, then determines a first forecast at a higher level (i.e. the Country level of the United States) using OnLine Analytical Processing aggregation, then determines a second, more accurate, forecast for the higher level (the Country level) without relying upon mere aggregation, determines the difference between the first and second forecasts, and stores that difference at the low, state, level (i.e. a dummy state category).

A user may then rely upon a conventional OnLine Analytical Processing method to provide a more accurate forecast because the aggregation across all of the states for the United States includes the dummy state which adjusts the forecast such that it is more accurate. Thus, the advantages of OnLine Analytical Processing may also be realized while simultaneously providing a more accurate forecast.

An exemplary embodiment of the invention may periodically repeat the above described process to update the dummy category. For example, the inventive method may be repeated, daily, weekly, monthly, or the like. In this manner, the advantages of OnLine Analytical Processing may be continuously realized while relying upon updated dummy categories which provide more accurate forecasts.

In an exemplary embodiment of the present invention, the higher level forecasting may be done at multiple higher-than-lowest levels across multiple dimensions and the differences may then be stored at each of these levels for each dimension. For example, a dummy category may be created at a country level, by comparing forecasts at a world level. In this manner, a more accurate forecast at the world level may then be provided by OnLine Analytical Processing by aggregating across all countries at the country level, including a dummy country.

In another exemplary embodiment of the present invention, the forecasting may be done across multiple dimensions. For example, in addition to the state dimension, the present invention may improve forecasting across a business sector dimension whose categories might, for example, include, a telecommunications sector, a public sector, a banking sector, and the like.

After performing an exemplary method in accordance with the present invention, a conventional OnLine Analytical Processing application may perform aggregations that provide forecasts having a higher accuracy because the aggregation includes the previously calculated error (the dummy category).

An OnLine Analytical Processing cube is nothing more than a database with specific rules on how to get higher level information. It is up to the user to determine what information they want, and if a user wants to obtain a forecast at a higher level, then the user now has a more accurate forecast at the higher level than has been previously available.

OnLine Analytical Processing cubes are used extensively by users who do not typically perform any calculation that is not an aggregation. Therefore, these users have not conventionally had access to the more accurate calculations which have been derived based upon, for example, non-linear modeling. These users are typically not statisticians. The present invention provides these users with the ability to obtain more accurate forecasts.

An exemplary method in accordance with the present invention, starts aggregating at the lowest level, and progresses higher through the levels while determining differences at each level and through different dimensions. The method stores these differences in the various leaves for each corresponding level and each corresponding dimension.

There is an added level of complexity when there are differing levels and dimensions, resulting in ambiguities as to how to allocate the differences. For example, at some point, there may be a need to allocate a difference across more than one dimension. Typically, there is more than one way to allocate a difference across more than one dimension, and there may be very many possible ways to do so. An example is when a difference can be allocated across a geographical dimension or a product type dimension, in differing quantities.

Conventional OnLine Analytical Processing cubes have included dummy categories. However, these categories stored data which merely could not fit into any other category. For example, some entries cannot always be associated with a lower-level view, such as a sale whose originating region is not known, but only whose originating country is known, such software provides typically an "unassigned," "unknown," or similar category at some or all hierarchical levels. The values in these "unassigned" categories are included in aggregations across the values in all of categories to obtain higher-level results. However, the computed financial metrics, such as forecasts, have not been issued for an unassigned category. This specific structure involving unassigned categories may be utilized by an exemplary embodiment of the present invention to provide a systematic method for more accurate data presentation.

In a first exemplary aspect of the present invention, a method for providing a forecast, includes providing a multi-dimensional database storing data at a lowest level, calculating a first forecast at a level that is higher than the lowest level in the database, calculating a forecast for each category within the lowest level, aggregating a second forecast across all categories at the lowest level based upon an aggregation of the calculated forecasts for each category within the lowest level, determining a difference between the first forecast and the second forecast, and storing the difference in a dummy category at the lowest level.

This invention provides a method for presenting data which is more accurate than has conventionally been available using aggregating type applications, such as OnLine Analytical Processing applications.

These and many other advantages may be achieved with the present invention.

BRIEF DESCRIPTION OF THE DRAWINGS

The foregoing and other exemplary purposes, aspects and advantages will be better understood from the following detailed description of an exemplary embodiment of the invention with reference to the drawings, in which.

DETAILED DESCRIPTION OF EXEMPLARY EMBODIMENTS OF THE INVENTION

Figure 1:
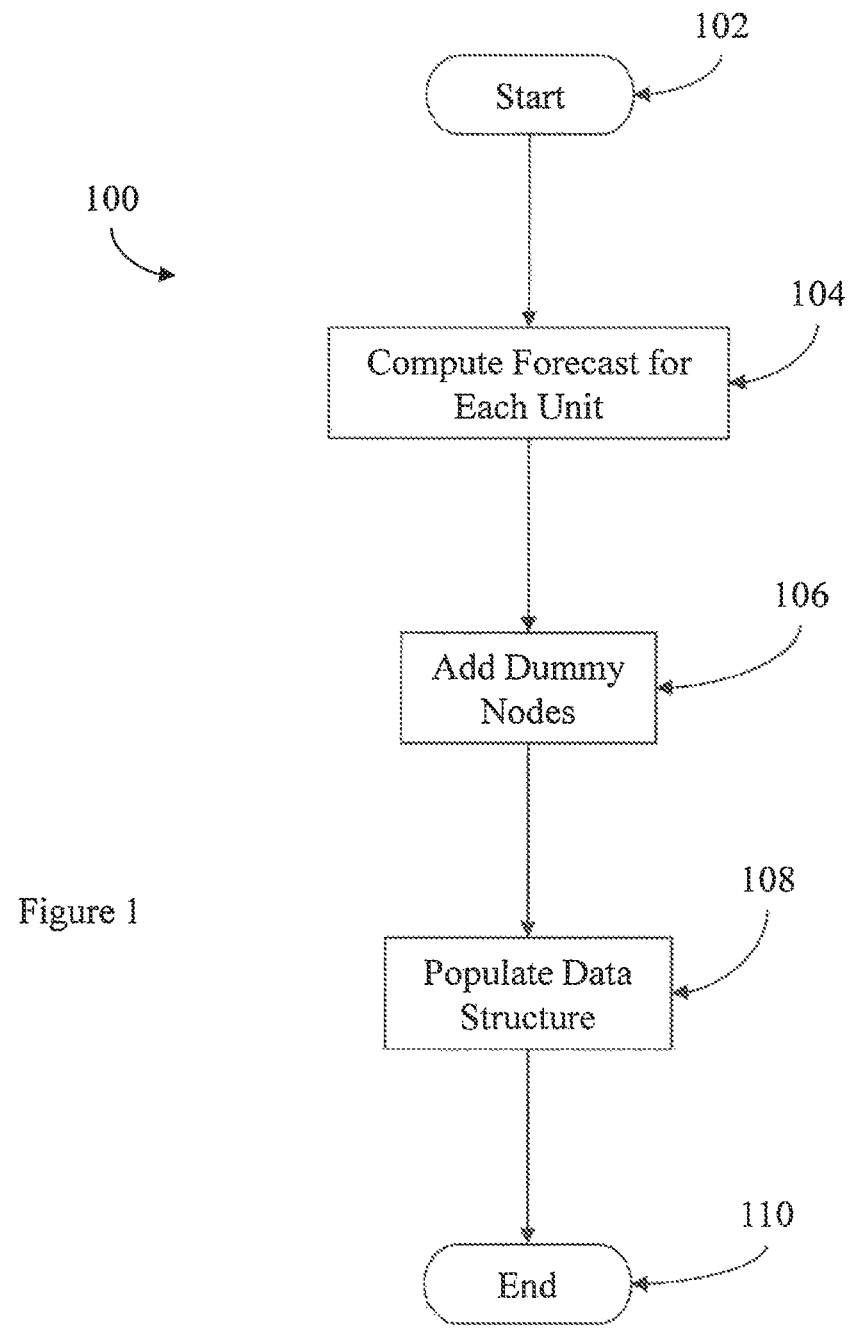
FIG. 1 illustrates a flowchart 100 of an exemplary method in accordance with the present invention.

Referring now to the drawings, and more particularly to FIGS. 1-7, there are shown exemplary embodiments of the method and structures of the present invention.

An exemplary embodiment of the present invention leverages the structure of multi-dimensional views and automatic aggregation and, in particular, an unassigned or unknown category to enable presentation of a hierarchy of computed financial data that does not permit aggregation across levels by simple addition.

For the purpose of the present application, the following definitions apply. These definitions are known to those of ordinary skill in the art. Dimensions are independently used to divide a dataset. For example, a data set may be divided across a geographical dimension, a product line dimension, a customer set dimension, or the like. Subdivisions along each dimension are called "categories." For each dimension, the categories are arranged in a hierarchy that has a number of levels.

The top level of a hierarchy may (but need not) consist of a single category that represents an entire business. For example, a geographic dimension may have different levels, such as, worldwide, continent, country, region, or the like.

In each level of a hierarchy, except the top level, the categories may be grouped into disjoint sets that are subdivisions of one category at the next higher level. Each of these higher-level categories may be an aggregation of a number of categories at the next lower level. For example, a country level may have a United Kingdom category that is a higher level than corresponding region-level categories that include England, Scotland, Wales, and Ireland. In this example, the country is a node, as are the regions, and the country node is the parent of the region nodes. Hence, the region nodes are descendants, or children, of a parent node.

Leaf nodes are those at the bottom of a hierarchy, i.e. with no children. A root node is the highest level, with no parent. As a concrete example, using geographical categories, a world-wide forecast would be a root node, and continent-level forecasts may be descendants of the world-wide level. Each continent-level forecast may have countries as descendants, and each country may have regions (e.g., states) as descendants. For this example, the regions (or states) may represent leaf nodes.

A "unit" is a combination of one category from each dimension. Each unit represents a part of a business for which forecasts or other data may be computed. For example, one unit may represent a combination of the United Kingdom country, all products, and public-sector customers.

A "data structure" is a multidimensional array whose dimensions are the "dimensions" defined above, and whose elements along each dimension are all or a subset of the "categories" defined above. A typical embodiment is a financial data management application such as an OnLine Analytical Processing application.

Elements of a data structure are called "cells." A cell corresponds to a combination of one category from each dimension of the data structure. Its data value is a business measurement for one unit of the business.

FIG. 1 illustrates a flowchart 100 of an exemplary method in accordance with the present invention. The flowchart 100 starts at step 102 and continues to step 104 where, for each unit, the forecast is computed and stored in a corresponding cell of an OnLine Analytical Processing cube. The method continues to step 106 where dummy nodes are added to the OnLine Analytical Processing cube for each dimension. In particular for each node n, that is not a leaf node, a dummy or "unassigned" node whose parent is node n is added to the structure. The method then continues to step 108 where the cells of the data structure are populated and the method ends in step 110.

Figure 2:
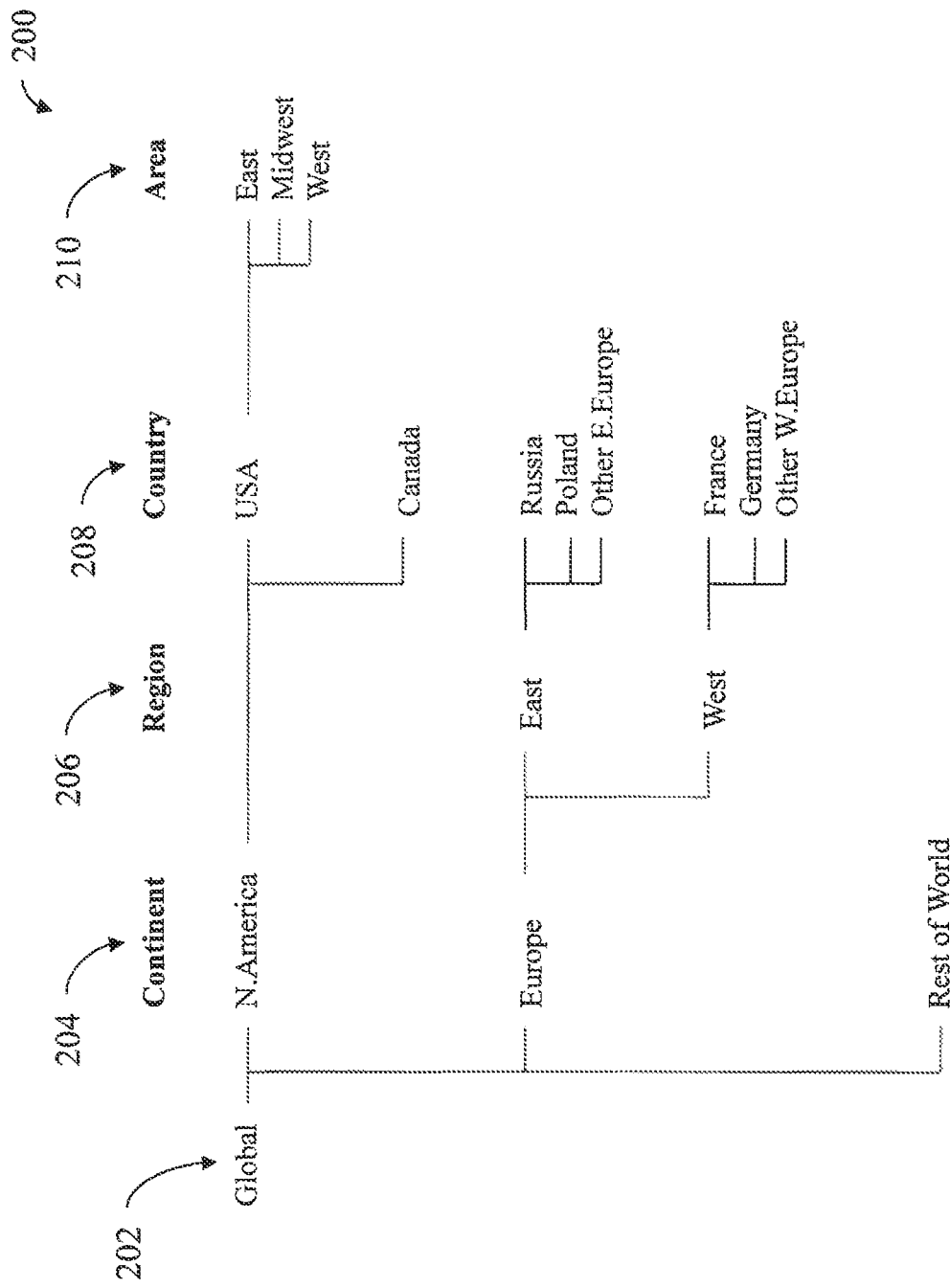
FIG. 2 illustrates an exemplary data structure 200 having a geographic dimension.
Figure 3:
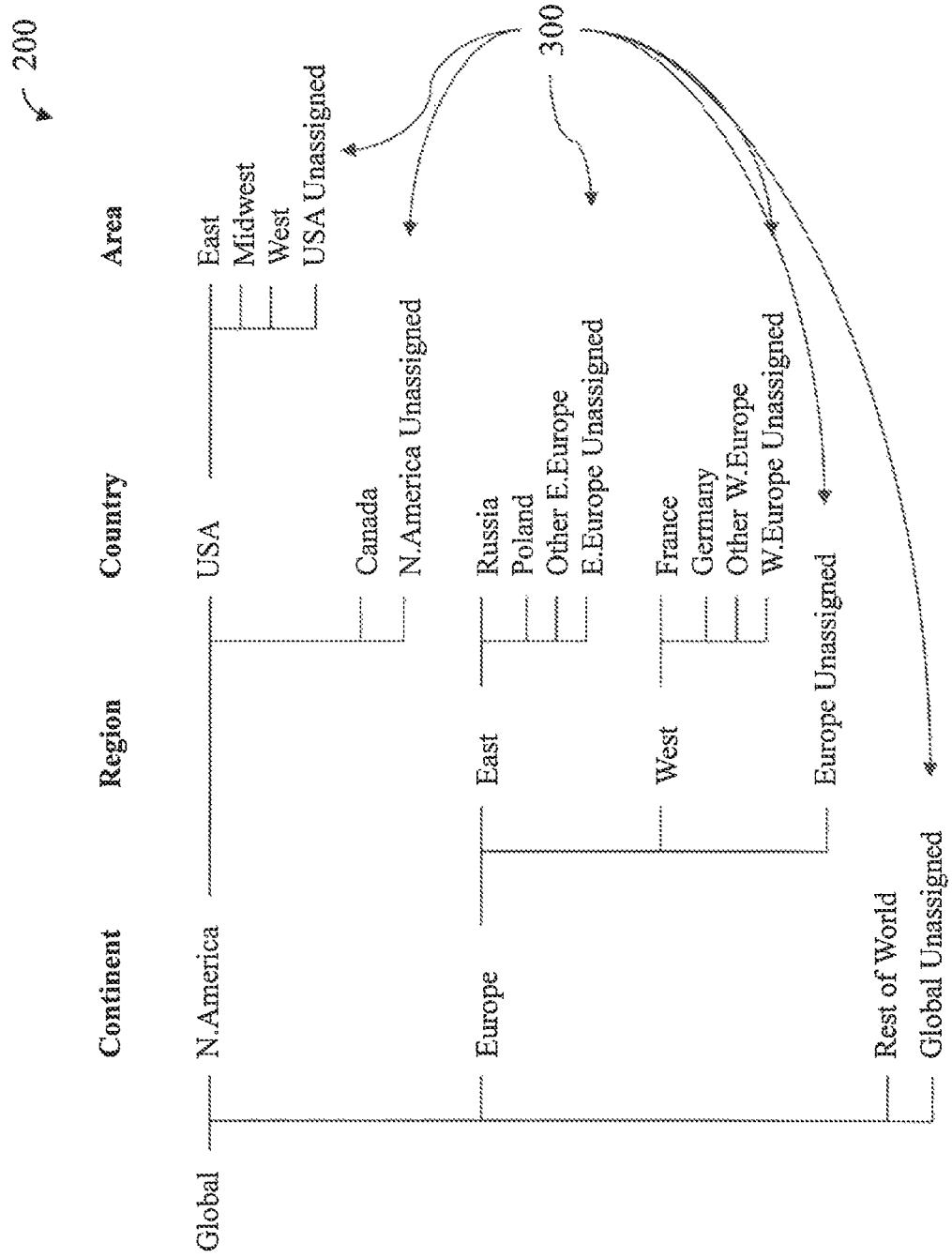
FIG. 3 illustrates the exemplary data structure 200 of FIG. 2 after receiving "unassigned" nodes 300 in accordance with the method of FIG. 1.

FIG. 2 illustrates an exemplary data structure 200 having a geographic dimension. The data structure 200 has five levels. A root level 202 called "global," a continent level 204, a region level 206, a country level 208, and an area level 210. FIG. 3 illustrates the same exemplary data structure 200 after receiving "unassigned" nodes 300 in accordance with the method of FIG. 1.

Figure 4A:
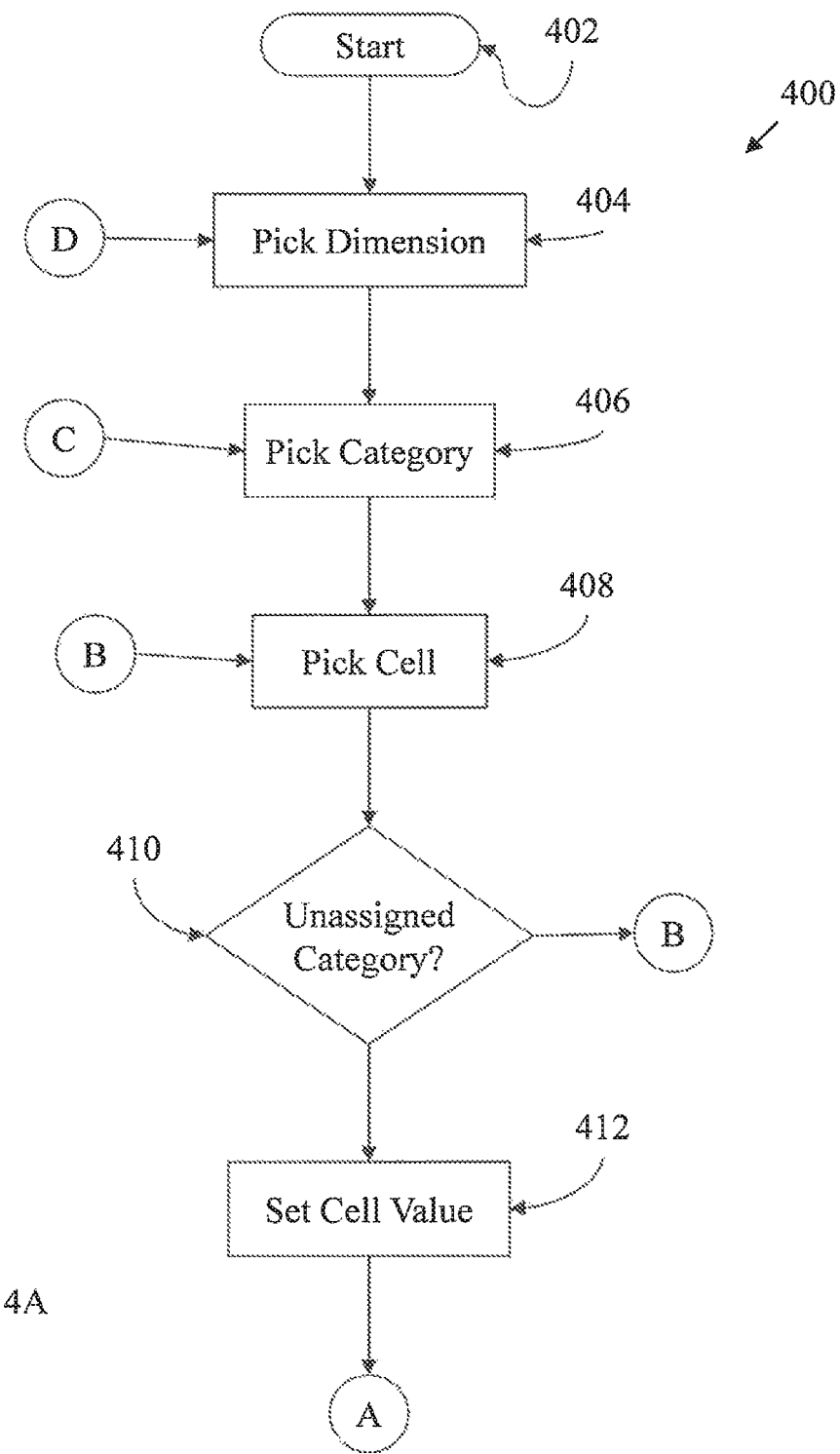
FIGS. 4A and 4B illustrate a flowchart 400 of an exemplary method for populating a data structure in accordance with the present invention.
Figure 4B:
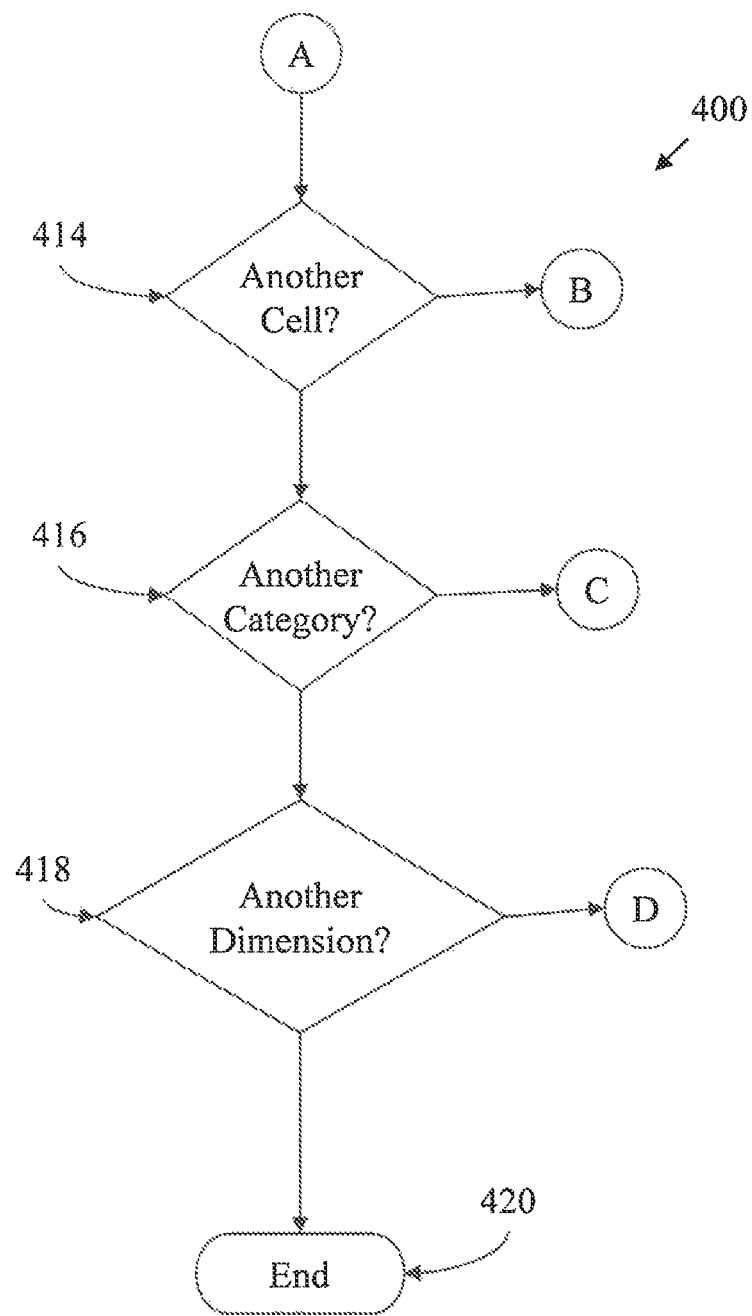

FIG. 4 illustrates a flowchart 400 of an exemplary method for populating a data structure in accordance with the present invention. The flowchart 400 starts at step 402 and continues to step 404. In step 404, the method selects a dimension d from a plurality of dimensions D along which a business is subdivided. The flowchart 400 continues to step 406 where the method selects an unassigned category c from a plurality of categories C.

Next, in step 408, the method selects a cell for which the combination of categories includes category c in dimension d and continues to step 410. In step 410, the method determines whether the selected cell includes an "unassigned" category in any of dimensions d+1, d+2, . . . , D. If, in step 410, the method determines that the cell does not include an "unassigned" category, then the method continues to step 412. If, however, in step 410, the method determines that the selected cell includes an "unassigned" category, then the method returns to step 408.

In step 412, the method sets the cell's data value to be the data value of the cell whose combination of categories is $(c_1, c_2, \ldots, c_{d-1}, p, c_{d+1}, \ldots, c_D)$, where p denotes the parent of c, minus the sum of the data values of the cells whose combination of categories is of the form $(c_1, c_2, \ldots, c_{d-1}, s, c_{d+1}, \ldots, c_D)$, where s denotes any sibling of c. Those of ordinary skill in the art understand that some or all of the categories $c_1, c_2, \ldots, c_{d-1}$ may be "unassigned," and have had their data values computed in an earlier iteration.

The method continues to step 414, where the method determines whether there is another cell for which the combination of categories includes category c in dimension d. If there is another such cell in the data structure, then the method returns to step 408. If, however, in step 414, the method determines that there is not another such cell, then the method continues to step 416.

In step 416, the method determines whether there is another category in the dimension. If there is another category in the dimension, then the method returns to step 406. If, however, in step 416, the method determines that there is not another category, then the method continues to step 418.

In step 418, the method determines whether there is another dimension in the data structure. If there is another dimension in the data structure, then the method returns to step 404. If, however, in step 418, the method determines that there is not another dimension, then the method continues to step 420 where the method ends.

Figure 5:
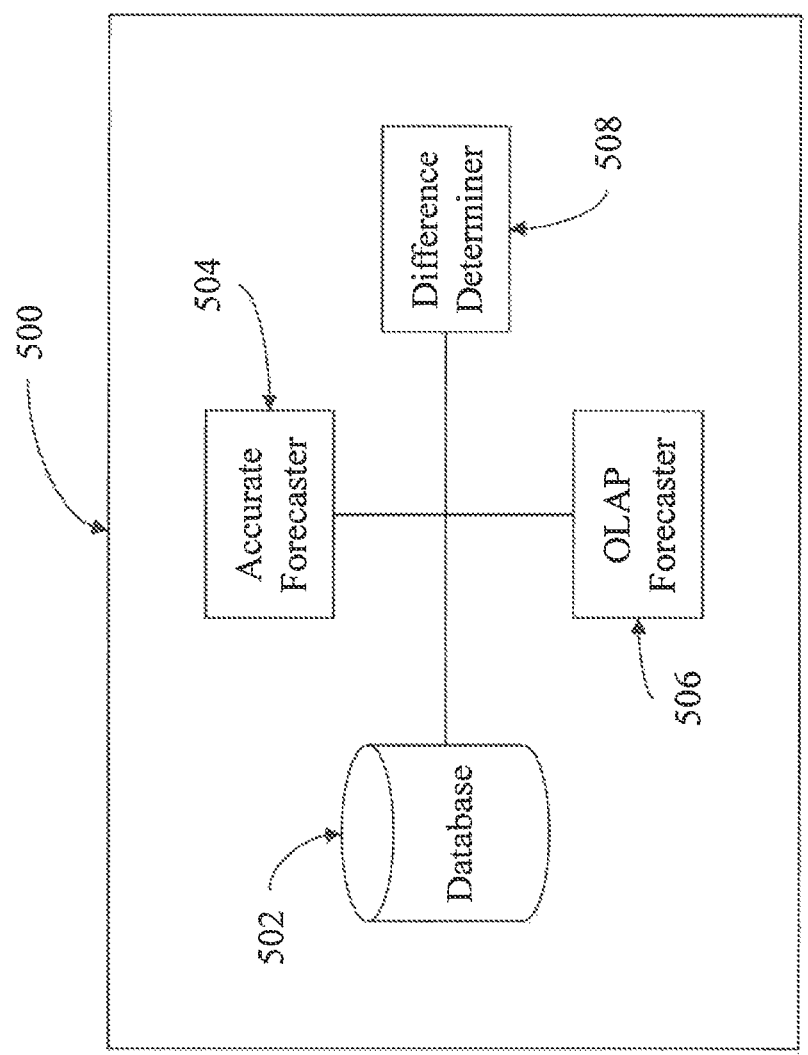
FIG. 5 illustrates an exemplary system 500 for forecasting using an OnLine Analytical Processing cube in accordance with the present invention.

FIG. 5 illustrates an exemplary system 500 for forecasting using an OnLine Analytical Processing cube in accordance with the present invention. The system 500 includes a database 502 storing the OnLine Analytical Processing cube, an accurate forecaster 504, an OnLine Analytical Processing forecaster 506, and a difference determiner 508. The database 502 stores an OnLine Analytical Processing cube storing data at a lowest level. The accurate forecaster 504 calculates a first forecast at a level that is higher than the lowest level in the database and calculates a forecast for each category within the lowest level. The OnLine Analytical Processing forecaster 506 calculates a second forecast based upon an aggregation of the calculated forecasts for each category within the lowest level. The difference determiner 508 determines a difference between the first forecast and the second forecast and stores the difference in a dummy category at the lowest level in the OnLine Analytical Processing cube in the database 502.

Figure 6:
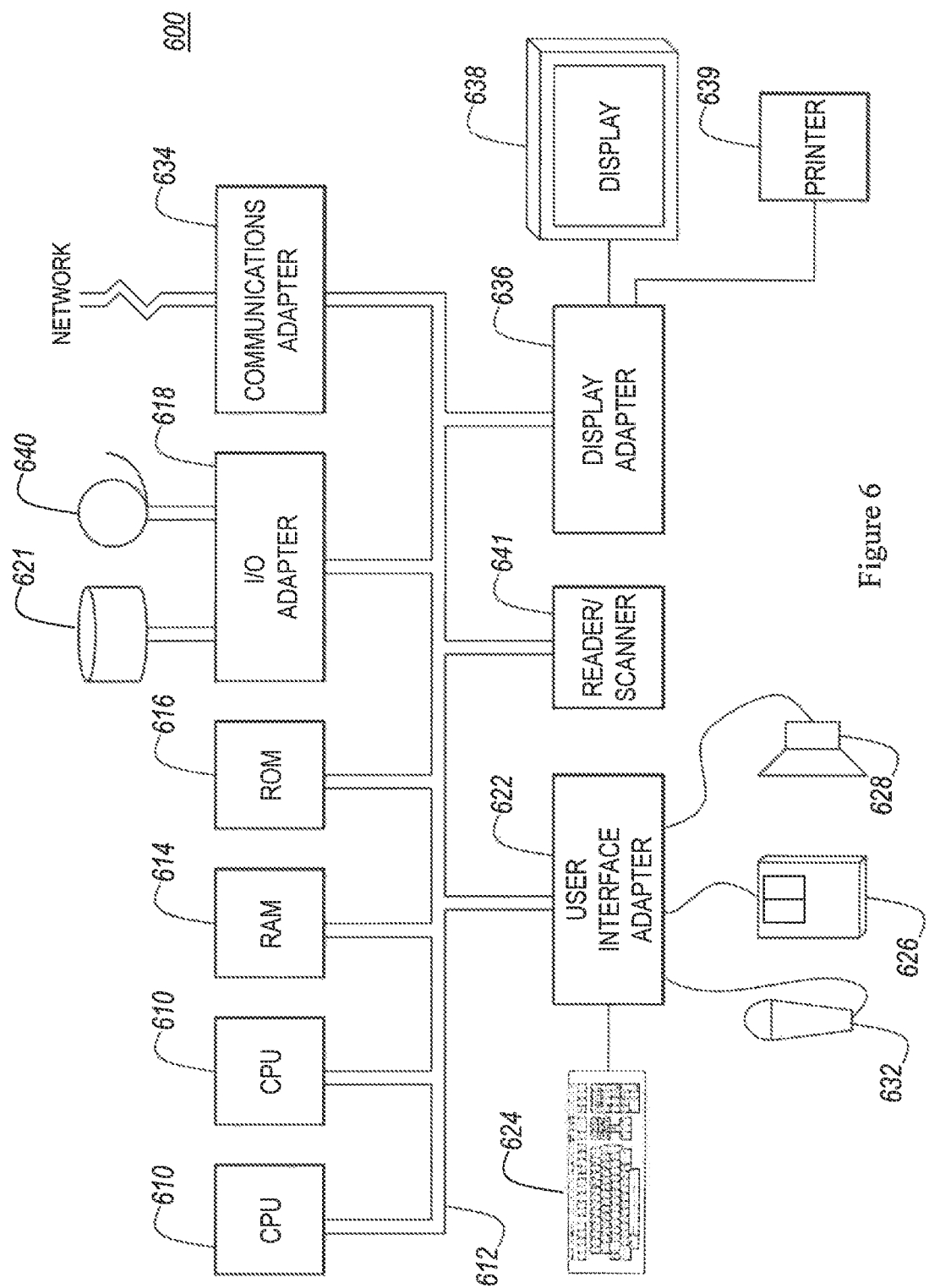
FIG. 6 illustrates an exemplary hardware/information handling system 600 for incorporating the present invention therein.
Figure 7:
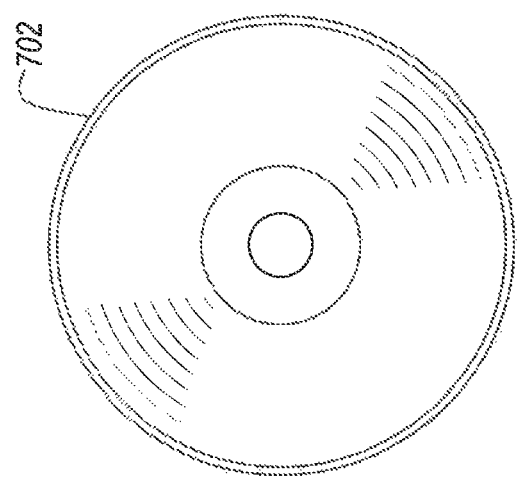
FIG. 7 illustrates a signal bearing medium 700 (e.g., storage medium) for storing steps of a program of a method according to the present invention.
Figure 7:
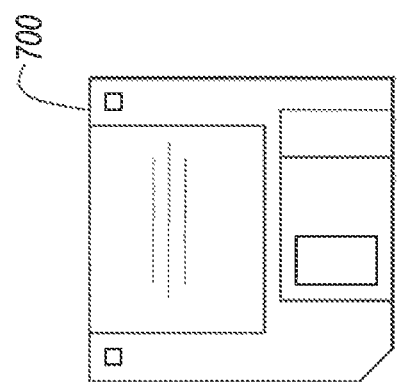

FIG. 6 illustrates a typical hardware configuration of an information handling/computer system for use with the invention and which preferably has at least one processor or central processing unit (CPU) 610.

The CPUs 610 are interconnected via a system bus 612 to a random access memory (RAM) 614, read-only memory (ROM) 616, input/output (I/O) adapter 618 (for connecting peripheral devices such as disk units 621 and tape drives 640 to the bus 612), user interface adapter 622 (for connecting a keyboard 624, mouse 626, speaker 628, microphone 632, and/or other user interface device to the bus 612), a communication adapter 634 for connecting an information handling system to a data processing network, the Internet, an Intranet, a personal area network (PAN), etc., and a display adapter 636 for connecting the bus 612 to a display device 638 and/or printer 639.

In addition to the hardware/software environment described above, a different aspect of the invention includes a computer-implemented method for performing the above method. As an example, this method may be implemented in the particular environment discussed above.

Such a method may be implemented, for example, by operating a computer, as embodied by a digital data processing apparatus, to execute a sequence of machine-readable instructions. These instructions may reside in various types of signal-bearing media.

This signal-bearing media may include, for example, a RAM contained within the CPU 610, as represented by the fast-access storage for example. Alternatively, the instructions may be contained in another signal-bearing media, such as a magnetic data storage diskette 700 or optical disk 702 (FIG. 7), directly or indirectly accessible by the CPU 610.

Whether contained in the diskette 700, the disk 702, the computer/CPU 610, or elsewhere, the instructions may be stored on a variety of machine-readable data storage media, such as DASD storage (e.g., a conventional "hard drive" or a RAID array), magnetic tape, electronic read-only memory (e.g., ROM, EPROM, or EEPROM), an optical storage device (e.g. CD-ROM, WORM, DVD, digital optical tape, etc.), paper "punch" cards, or other suitable signal-bearing media including transmission media such as digital and analog and communication links and wireless. In an illustrative embodiment of the invention, the machine-readable instructions may comprise software object code, compiled from a language such as "C", etc.

While the invention has been described in terms of several exemplary embodiments, those skilled in the art will recognize that the invention can be practiced with modification.

Further, it is noted that, Applicant's intent is to encompass equivalents of all claim elements, even if amended later during prosecution.

What is claimed is:

1. A method for providing a forecast, the method comprising:
   providing a multi-dimensional database storing data at a lowest level in a first dimension;
   executing a processing unit of a computer for:
      calculating a first forecast at a level that is higher than the lowest level of the first dimension in the multi-dimensional database;
      calculating a forecast for each category within the lowest level of the first dimension;
      calculating a second forecast at the level that is higher than the lowest level of the first dimension in the multi-dimensional database, the second forecast for any given category being within the level that is higher than the lowest level of the first dimension in the multi-dimensional database, based upon an aggregation of at least one value in at least one category within the lowest level of the first dimension; and
      determining a difference between the first forecast and the second forecast;
      creating a dummy category including a new category at the lowest level of the first dimension; and
      storing the difference in the dummy category at the lowest level of the first dimension.

2. The method of claim 1, wherein the calculating the second forecast comprises aggregating the second forecast across all categories at the lowest level of the first dimension.

3. The method of claim 1, wherein the multi-dimensional database comprises an OnLine Analytical Processing Cube.

4. The method of claim 1, wherein the multi-dimensional database stores financial data.

5. The method of claim 4, wherein the first forecast and the second forecast comprise revenue forecasts.

6. The method of claim 1, wherein the multi-dimensional database further stores data at a lowest level in a second dimension.

7. The method of claim 6, further comprising:
   calculating a third forecast at a level that is higher than the lowest level of the second dimension in the database;
   calculating a forecast for a category within the lowest level of the second dimension;
   aggregating a fourth forecast across all categories at the lowest level of the second dimension;
   determining a difference between the third forecast and the fourth forecast; and
   storing the difference in a dummy category at the lowest level of said second dimension.

8. The method of claim 7, wherein calculating a forecast for a category within the lowest level of the second dimension comprises calculating a forecast for each category within the lowest level of the second dimension.

9. The method of claim 7, wherein the calculating the first forecast across a category at the lowest level of the second dimension comprises aggregating a fourth forecast across all categories at the lowest level of said second dimension.

10. The method of claim 1, further comprising adding the dummy category at the lowest level of the first dimension before the storing.

11. The method of claim 1, further comprising:
   periodically calculating the first forecast at a level that is higher than the lowest level of a first dimension in the database;
   periodically calculating the forecast for a category within the lowest level of the first dimension;
   periodically aggregating a second forecast across a category at the lowest level of the first dimension based upon an aggregation of the calculated forecast for the category within the lowest level of the first dimension;
   periodically determining the difference between the first forecast and the second forecast; and
   updating the dummy category at the lowest level of said first dimension based upon the periodically determined difference.

12. The method of claim 11, wherein the periodically calculating the forecast for a category within the lowest level of the first dimension comprises periodically calculating the forecast for each category within the lowest level of said first dimension.

13. The method of claim 11, wherein periodically aggregating a second forecast across a category at the lowest level of the first dimension comprises periodically aggregating a second forecast across all categories at the lowest level of said first dimension.

14. A system for providing a forecast, the system comprising:
a database storing multi-dimensional database storing data at a lowest level; and
a processing unit of a computer for executing:
a forecaster that calculates a first forecast at a level in a first dimension that is higher than the lowest level in the multi-dimensional database and that calculates a forecast for a category within the lowest level in the first dimension;
another forecaster that calculates a second forecast at the level that is higher than the lowest level of the first dimension in the multi-dimensional database, the second forecast for any given category being within the level that is higher than the lowest level of the first dimension in the multi-dimensional database, based upon an aggregation of at least one value in at least one category within the lowest level in the first dimension;
a processor that creates a dummy category including a new category at the lowest level in the first dimension; and
a difference determiner that determines a difference between the first forecast and the second forecast and that stores the difference in the dummy category at the lowest level in the first dimension of the multi-dimensional database.

15. The system of claim 14, wherein the forecaster calculates a forecast for each category within the lowest level in said first dimension.

16. The system of claim 14, wherein said another forecaster calculates the second forecast based upon an aggregation of the calculated forecasts for each category within the lowest level in said first dimension.

17. The system of claim 14, wherein the multi-dimensional database comprises an OnLine Analytical Processing Cube.

18. The system of claim 14, wherein said another forecaster comprises an OnLine Analytical Processing forecaster.

19. The system of claim 14, wherein the multi-dimensional database further stores data at a lowest level in a second dimension.

20. The system of claim 19, wherein said forecaster calculates a third forecast at a level that is higher than the lowest level of a second dimension in the database and that calculates a forecast for each category within the lowest level for the second dimension, said another forecaster calculates a fourth forecast based upon an aggregation of a calculated forecast for a category within the lowest level in the second dimension, and wherein the difference determiner determines a difference between the third forecast and the fourth forecast and that stores the difference in a dummy category at the lowest level in the second dimension of the multi-dimensional database.

* * * * *